United States Patent
Cheng et al.

(10) Patent No.: US 11,483,773 B2
(45) Date of Patent: Oct. 25, 2022

(54) SCHEDULING FOR POWER SAVING STATE IN NEXT GENERATION WIRELESS NETWORKS

(71) Applicant: Hannibal IP LLC, Frisco, TX (US)

(72) Inventors: Yu-Hsin Cheng, Hsinchu (TW); Chie-Ming Chou, Hsinchu (TW); Wan-Chen Lin, Hualien (TW); Tsung-Hua Tsai, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

(21) Appl. No.: 16/739,780

(22) Filed: Jan. 10, 2020

(65) Prior Publication Data

US 2020/0229098 A1 Jul. 16, 2020

Related U.S. Application Data

(60) Provisional application No. 62/791,210, filed on Jan. 11, 2019.

(51) Int. Cl.
*H04W 52/02* (2009.01)
*H04L 1/18* (2006.01)
*H04W 72/04* (2009.01)

(52) U.S. Cl.
CPC ....... *H04W 52/0248* (2013.01); *H04L 1/1812* (2013.01); *H04W 52/0235* (2013.01); *H04W 72/042* (2013.01)

(58) Field of Classification Search
CPC ............ H04L 1/1812; H04W 52/0229; H04W 52/0235; H04W 52/0248; H04W 72/042; Y02D 30/70

USPC ......................................................... 370/311
See application file for complete search history.

(56) References Cited

U.S. PATENT DOCUMENTS

| 2020/0053755 | A1* | 2/2020 | Ang | H04W 72/0453 |
| 2020/0092073 | A1* | 3/2020 | Papasakellariou | H04L 5/0094 |
| 2020/0107265 | A1* | 4/2020 | Hwang | H04W 52/0216 |
| 2020/0107340 | A1* | 4/2020 | Tang | H04W 72/1263 |

(Continued)

FOREIGN PATENT DOCUMENTS

| CN | 113906789 | 1/2022 |
| EP | 3909295 | 11/2021 |

(Continued)

OTHER PUBLICATIONS

Ericsson, Aspects of UE power saving in UL transmission, 3GPP TSG-RAN WG1 Meeting #95 Tdoc R1-1813188, Nov. 16, 2018(Nov. 16, 2018), the whole document.

(Continued)

*Primary Examiner* — Robert J Lopata
(74) *Attorney, Agent, or Firm* — Marcella M. Bodner; Cole Schotz, P.C.

(57) ABSTRACT

Some of the present implementations provide a method for a user equipment (UE) for receiving a power saving signal. The method receives, from a base station, a power saving signal comprising a minimum applicable K0 (K0min) that indicates a minimum scheduling offset restriction between a physical downlink control channel (PDCCH) and a physical downlink shared channel (PDSCH). The method determines an application delay based on a predefined value. The method then applies the minimum scheduling offset restriction after the application delay.

18 Claims, 9 Drawing Sheets

(56) References Cited

U.S. PATENT DOCUMENTS

| | | | |
|---|---|---|---|
| 2020/0252949 A1* | 8/2020 | Kim | H04L 5/0053 |
| 2020/0267643 A1* | 8/2020 | Wu | H04L 5/0053 |
| 2020/0351638 A1* | 11/2020 | Kim | H04W 8/005 |
| 2020/0351926 A1* | 11/2020 | Bagheri | H04W 72/1289 |
| 2021/0099985 A1* | 4/2021 | Ang | H04W 72/044 |
| 2021/0321446 A1* | 10/2021 | Lee | H04L 5/0044 |
| 2022/0078880 A1* | 3/2022 | Maleki | H04W 52/0216 |

FOREIGN PATENT DOCUMENTS

| | | |
|---|---|---|
| WO | 2018029637 A1 | 2/2018 |
| WO | 2020143711 | 7/2020 |

OTHER PUBLICATIONS

Qualcomm Incorporated, UE Adaptation to the Traffic and UE Power Consumption Characteristics, 3GPP TSG-RAN WG1 Meeting #95 R1-1813447, Nov. 16, 2018(Nov. 16, 2018), the whole document.

Sony, Conditions and procedures for adaptation of power consumption characteristics, 3GPP TSG RAN WG1 Meeting #95 R1-1812750, Nov. 16, 2018(Nov. 16, 2018), section 4, figure 3.

Hua Wei et al.. Procedure of cross-slot scheduling for UE power saving, 3GPP TSG RAN WGI #97 R1-1906006, May 17, 2019, section 2.3.

Ericsson, Triggers of NR UE power saving, 3GPP TSG-RAN WG1 Meeting #95 R1-1813183, Nov. 16, 2018 (Nov. 11, 2018), sections 1-4, figure 2.

Examination Report for Indian Patent Application No. 202147035880, (National Phase Application based on PCT/CN2020/071180) dated Mar. 17, 2022.

International Preliminary Report on Patentability for International Patent Application No. PCT/CN2020/071180 dated Jun. 16, 2021.

International Search Report for International Patent Application No. PCT/CN2020/071180, dated Mar. 30, 2020.

Written Opinion of International Searching Authority for International Patent Application No. PCT/CN2020/071180, dated Mar. 30, 2020.

* cited by examiner

SCHEDULING FOR POWER SAVING STATE IN NEXT GENERATION WIRELESS NETWORKS

CROSS-REFERENCE TO RELATED APPLICATION(S)

The present application claims the benefit of and priority to a provisional U.S. Patent Application Ser. No. 62/791,210, filed on Jan. 11, 2019, entitled "Method and Apparatus for HARQ Mechanism for Power Saving State," (hereinafter referred to as "US76308 application"). The disclosure of the US76308 application is hereby incorporated fully by reference into the present application.

FIELD

The present disclosure generally relates to wireless communications, and more particularly, to applying scheduling offset for power saving in the next generation wireless networks.

BACKGROUND

Hybrid automatic repeat request (HARQ) is a combination of high-rate forward error-correcting coding and automatic repeat request (ARQ) error-control. In HARQ, the data is encoded with a forward error correction code, and the parity bits are either immediately sent along with the message or only transmitted upon request when a receiver detects an erroneous message.

When a UE receives a power saving indicator, the UE may enter a power saving state. The HARQ operation in New Radio (NR) does not consider the usage of the power saving state, which may cause several issues when a user equipment (UE) enters the power saving state. For example, when the UE enters the power saving state, the $K_1$ parameter (e.g., the parameter that shows the delay between a downlink (DL) data reception and a corresponding acknowledgment/negative-acknowledgment (ACK/NACK) transmission on an uplink (UP) channel) may be changed. As such, the UE may transmit incorrect HARQ information to the base station (BS) after entering the power saving state.

In addition, some radio resource control (RRC) parameters, such as time domain parameters (e.g., $K_0$, $K_1$, $K_2$ and/or start/length (S/L) indicator value for a physical downlink shared channel (PDSCH) time allocation), frequency domain parameters (e.g., bandwidth (BW) size, and/or sub-carrier spacing (SCS)), or spatial domain parameters (e.g., number of active antenna panels) may be changed after the UE enters the power saving state.

Furthermore, a UL data channel may include some default beam operations behavior. For example, for a physical uplink shared channel (PUSCH) scheduled by a downlink control information (DCI) format 0_0 on a cell, the UE may transmit the PUSCH according to the spatial relation (if applicable) corresponding to the Physical Uplink Control Channel (PUCCH) resource with the lowest ID within the active UL bandwidth part (BWP) of the cell. However, it is possible that the PUCCH resource with the lowest ID may be associated with a deactivated antenna panel of the UE.

SUMMARY

The present disclosure is directed to applying scheduling offset for power saving in the next generation wireless networks.

In a first aspect of the present application, a method for a user equipment (UE) for receiving a power saving signal is provided. The method comprises receiving, from a base station, a power saving signal comprising a minimum applicable $K_0$ ($K_{0min}$) that indicates a minimum scheduling offset restriction between a physical downlink control channel (PDCCH) and a physical downlink shared channel (PDSCH); determining an application delay based on a predefined value; and applying the minimum scheduling offset restriction after the application delay.

An implementation of the first aspect further comprises, during the application delay, applying another scheduling offset between the PDCCH and the PDSCH that is different than the minimum scheduling offset indicated by the $K_{0min}$.

In another implementation of the first aspect, the other scheduling offset is configured by radio resource control (RRC) signaling.

In another implementation of the first aspect, the power saving signal is received through downlink control information (DCI).

In another implementation of the first aspect, the DCI is first DCI, the implementation comprises: receiving, after the application delay, second DCI comprising an applicable $K_0$ that indicates a scheduling offset between the PDCCH and the PDSCH; determining whether a value of the $K_0$ is bigger than a value of the $K_{0min}$; and applying the scheduling offset indicated by the $K_0$ after determining that the value of the $K_0$ is bigger than the value of the $K_{0min}$.

Another implementation of the first aspect further comprises, forgoing applying the minimum scheduling offset restriction indicated by the $K_{0min}$ after determining that the value of the $K_0$ is smaller than the value of the $K_{0min}$.

Another implementation of the first aspect further comprises, after a time offset from the receiving of the power saving signal, sending a HARQ feedback for the power saving signal from the UE to the base station, where the time offset is specified in the power saving signal.

Another implementation of the first aspect further comprises, after a time offset from the receiving of the power saving signal, sending a HARQ feedback for the power saving signal from the UE to the base station, where the time offset is received via RRC signaling.

In a second aspect of the present application, a UE comprising one or more non-transitory computer-readable media having computer-executable instructions for receiving a power saving signal; and at least one processor is provided. The processor is coupled to the one or more non-transitory computer-readable media, and configured to execute the computer-executable instructions to: receive, from a base station, a power saving signal comprising an indicator ($K_{0min}$) that indicates a minimum timing scheduling between a PDCCH and a PDSCH; determine an application delay based on a predefined value; and apply the timing scheduling after the application delay.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
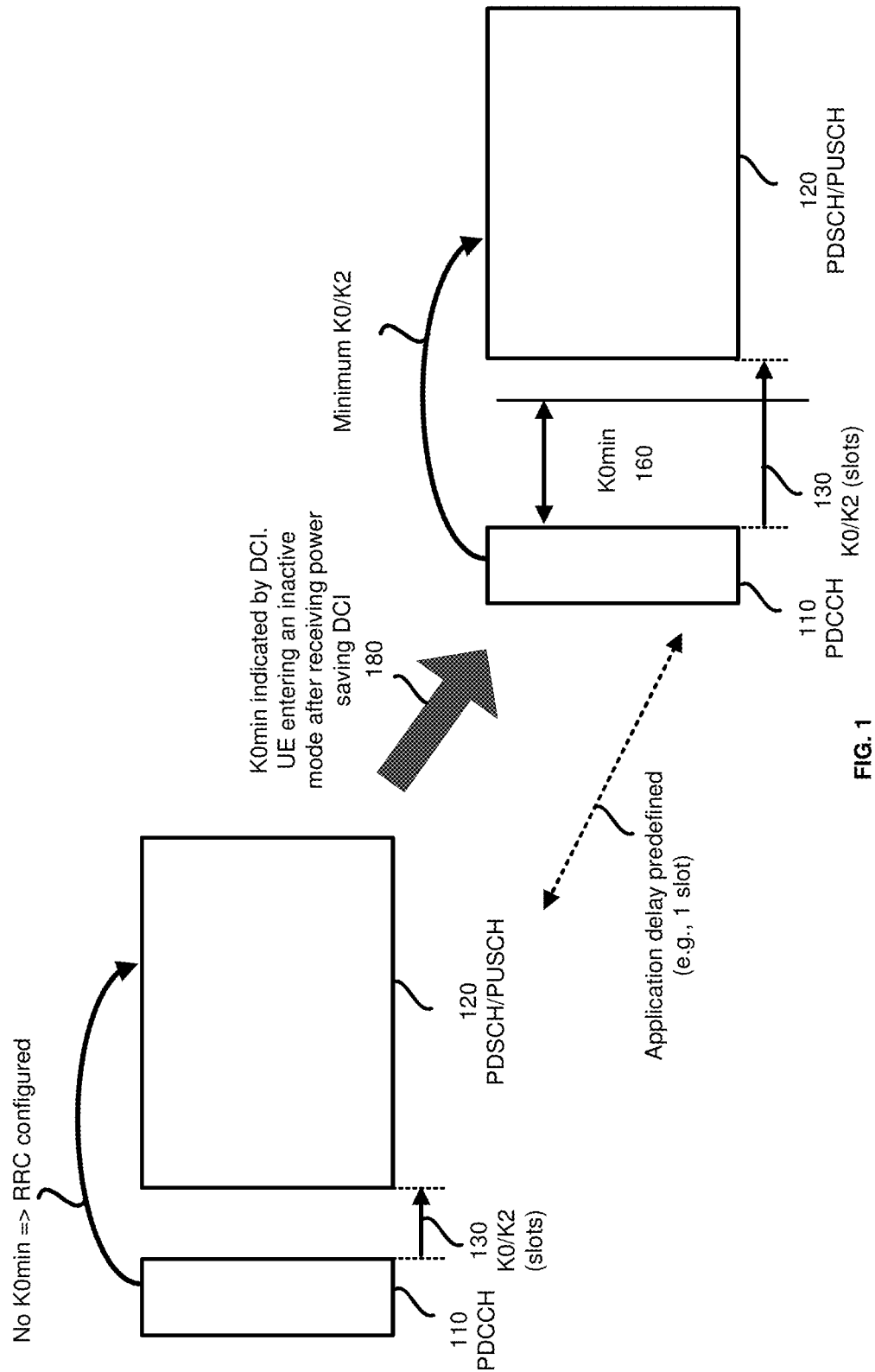
FIG. 1 is a diagram illustrating a UE receiving minimum values specified for the $K_0$ and/or $K_2$ that may allow the UE to enter an inactive mode such as a micro sleep mode, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some of the present implementations," which may each refer to one or more of the same or different implementations. The term "coupled" is defined as connected, whether directly or indirectly through intervening components, and is not necessarily limited to physical connections. The term "comprising." when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B. or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE. e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB). Massive Machine Type Communication (mMTC). Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

The UE's battery life is an important aspect of the user's experience and may influence the adoption of the 5G NR handsets and/or services. It is, therefore, critical to ensure that the power efficiency of a UE operating in 5G NR is better than the power efficiency of a UE operating in LTE, and at the same time, new techniques and designs for improvements are identified and adopted.

Because the NR system supports high data rate transmission, the data burst may be served by the network in very short time durations. The UE may stay in a power efficient mode, such as a micro sleep, OFF period, or in a long discontinuous reception (DRX) cycle in order to save the operating power. Alternatively, the network may, under certain conditions, configure the UE to switch from the "power saving" mode to a "normal power consumption" mode.

Moreover, there are several aspects, such as time domain power saving, frequency domain power saving, and antenna panel/port domain power saving, that may affect the UE's power saving state. However, due to the change of dl-DataToUL-ACK (the parameter that includes the list of timing for a given PDSCH to the DL ACK) for time domain power saving, the HARQ mechanism in NR may not be accurate. Therefore, some of the present implementations introduce new mechanisms to solve the HARQ issues in a power saving state of the UE, and ensure the reliability for reception of power saving indicator in light of the change to many of the parameters in the power saving state.

In the discussions herein, the term $K_0$ may refer to the delay between a DL grant and a corresponding DL data (e.g., the PDSCH) reception, the term $K_1$ may refer to the delay between the DL data reception and a corresponding ACK/NACK transmission on the UL, and the term $K_2$ may refer to the delay between the UL grant reception in DL and UL data (e.g., the PUSCH) transmission.

It should be noted that in the implementations described above and below, the UE may activate/enter the power saving state when the UE receives one or more power saving signals. The power saving signals/indication may include, at least, the existing signal/channel based power saving signal/channel. The existing signal/channel based power saving signal/channel may include the DCI in the PDCCH channel, the tracking reference signal (TRS), the channel state information-reference signals (CSI-RS) type reference signal (RS), the secondary synchronization signal (SSS)-like RS, demodulation reference signal (DMRS), PDSCH channel carried medium access control (MAC) control element (CE) and/or RRC signaling, and/or new power saving signal/channel.

In some of the present implementations, the UE may activate/enter the power saving state with a timing offset after the UE receives a power saving signal. The timing offset may be related to the UE capability for decoding the PDCCH or the power saving signal, or waking up from either a deep sleep, a light sleep, and/or a micro sleep. For an active DL bandwidth part (BWP) and/or an active UL BWP, after the UE is indicated to change the minimum applicable values of the $K_0$ and/or $K_2$, and before the change indication takes effect, data with restriction based on the current active minimum applicable values of the $K_0$ and/or $K_2$ may be scheduled to the UE.

FIG. 1 is a diagram illustrating a UE receiving minimum values specified for the $K_0$ and/or $K_2$ that may allow the UE to enter an inactive mode, such as a micro sleep mode, according to an example implementation of the present application. As shown on the upper left side of the figure, the values of the $K_0$ and $K_2$ may be configured in the RRC label and there may be no minimum value specified for the $K_0$. The UE (not shown) may have to wait until the UE successfully decodes the DCI to identify the values of the $K_0$ and $K_2$ (which may determine a time 130 between receiving a PDCCH 110 and receiving a PDSCH/PUSCH 120). The UE may then go into a micro sleep mode for power saving before receiving the PDSCH/PUSCH 120.

After an application delay (which may be a predefined value, such as 1 slot), the UE may use the minimum values of the $K_0$ and $K_2$ to switch (as shown by 180) to the behavior show in the lower right side of the figure. As shown in the lower right side of the figure, in some of the present implementations, the minimum values for the $K_0$ and/or $K_2$ may be indicated by the DCI, or by the RRC signaling. The UE may be able to make sure that there is no data to receive or transmit for the period indicated by the minimum value for the $K_0$ ($K_{0min}$) 160. The UE may, therefore, go to a micro sleep mode during the period indicated by the $K_{0min}$ to save power.

Figure 2:
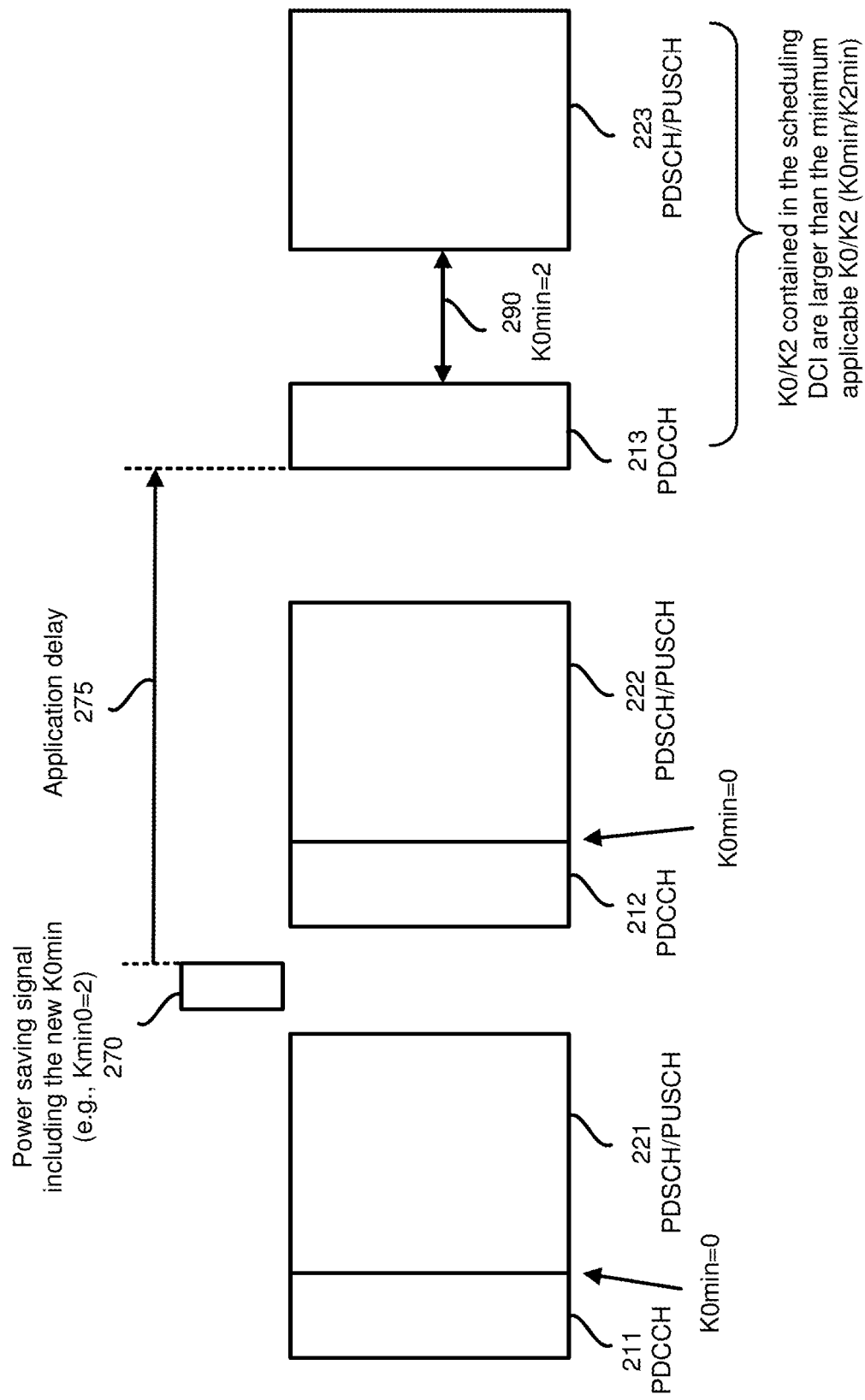
FIG. 2 is a diagram illustrating the BS ensuring that the values specified for the $K_0$ and $K_2$ are larger than the minimum values for the $K_0$ and $K_2$, according to an example implementation of the present application.

FIG. 2 is a diagram illustrating a base station ensuring that the values specified for the $K_0$ and $K_2$ are larger than the minimum values for the $K_0$ and $K_2$, according to an example implementation of the present application. As shown, when the $K_{0min}$ is 0, the $K_0$ and $K_2$ may also be 0 (e.g., the PDSCH/PUSCH 221 may be received immediately after the PDCCH 211 and the PDSCH/PUSCH 222 may be received immediately after the PDCCH 212). The UE may, therefore, be unable to go to a micro sleep mode during the first two slots.

With further reference to FIG. 2, a power saving signal 270 may be received by the UE that may indicate a non-zero $K_{0min}$ (e.g., in the example of FIG. 2, the $K_{0min}$ is 2). As shown, the UE may apply an application delay 275 after receiving the power saving signal 270 in some of the present implementations. In some of the present implementations, the application delay 275 may be a predefined value, while in other implementations, the application delay 275 may be received from the base station (e.g., through the RRC signaling).

The BS, in some of the present implementations, may ensure that $K_0$ and $K_2$ contained in the scheduling DCI are larger than the minimum applicable $K_0$ and $K_2$ after applying the application delay. Similarly, the UE may know that there may not be any additional data received from the BS for the duration of the $K_{0min}$. The UE may therefore, in some of the present implementations, go into an inactive state (such as a micro sleep mode) during the $K_{0min}$ duration 290 between a PDCCH 213 and a PDSCH/PUSCH 223 in the third slot.

Figure 3:
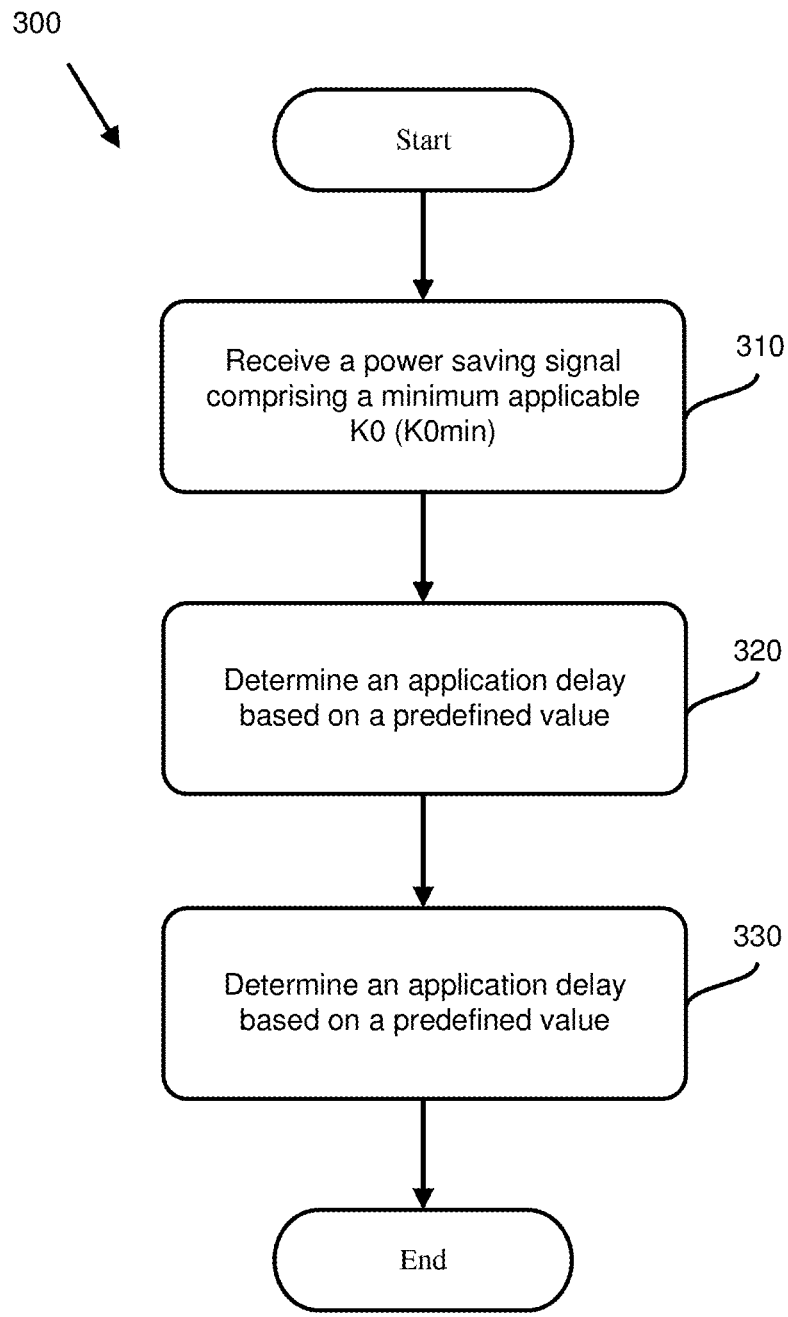
FIG. 3 is a flowchart illustrating a method (or process) performed by a UE to receive a power saving signal, according to an example implementation of the present application.

In some of the present implementations, when the UE is scheduled (e.g., via the DCI) with a minimum scheduling offset restriction field, the UE may determine the $K_{0min}$ value to be applied, while the previously received $K_{0min}$ value is applied until the new value takes effect (e.g., after the application delay). FIG. 3 is a flowchart illustrating a method (or process) 300 performed by a UE to receive a power saving signal, according to an example implementation of the present application. The process 300 may be performed by a controller, such as a processor or a microcontroller of a UE. The process 300 may start in action 310 by receiving, from a base station, a power saving signal that includes a minimum applicable $K_0$ ($K_{0min}$). As described above, with reference to FIG. 1, the $K_{0min}$ 160 may indicate a minimum scheduling offset restriction between the PDCCH 110 and the PDSCH 120.

With continued reference to FIG. 3, in action 320, the process 300 may determine an application delay (e.g., based on a predefined value). The application delay, in some of the present implementations, may be predefined (e.g., the application delay may be set to 1 slot) or may be configured to the UE by a serving cell. During the application delay, the process 300 in some of the present implementations, may apply another scheduling offset between the PDCCH and the PDSCH that is different than the minimum scheduling offset indicated by the $K_{0min}$. The other scheduling offset may be configured, for example, via the RRC signaling.

The power saving signal, in some of the present implementations, may be received through the DCI. In some of the present implementations, after the application delay, the process 300 may receive a second DCI that may include an applicable $K_0$ that indicates a scheduling offset between the PDCCH and the PDSCH. The process 300 may then determine whether the value of the $K_0$ is bigger than a value of the $K_{0min}$.

The process 300 may apply the scheduling offset indicated by the $K_0$ after determining that the value of the $K_0$ is bigger than the value of the $K_{0min}$. The process 300 may then forgo applying the minimum scheduling offset restriction indicated by the $K_{0min}$ after determining that the value of the $K_0$ is smaller than the value of the $K_{0min}$. In action 330, the process 300 may then apply the minimum scheduling offset restriction after the application delay.

Some of the present implementations may provide a mechanism for a UE to provide feedback after receiving a power saving indicator. In NR, the UE may change the time domain behavior, such as, the PDSCH time domain resource allocation (i.e., the $K_0$), dl-DataToUL-ACK (i.e., the $K_1$), PUSCH time domain resource allocation (i.e., the $K_2$), and/or another time/frequency/antenna domain parameter. Without a feedback, the missing of the power saving signals transmitted from BS by the UE may cause confusion/misalignment.

For example, if the BS considers the UE is in power saving state, the BS may indicate a $K_2$ value of power saving state for the UE to transmit the PUSCH. However, the BS may not receive the corresponding PUSCH based on the indicated $K_2$ value because the UE may miss the power saving signals, and the $K_2$ set for the power saving and the $K_2$ set for the non-power saving may be different.

To overcome these shortcomings in NR, in some of the present implementations, the UE may transmit a feedback for the power saving signal after the UE receives the power saving indicator. The advantage of a HARQ-ACK only mechanism is that the DCI format for power saving signal may be transmitted periodically, whereas the BS may not trigger the UE to enter/leave the power saving state all the time. The UE may therefore, in some of the present implementations, only transmit the ACK when the UE successfully receives the power saving signals (e.g., to avoid a HARQ feedback overhead).

Another advantage of the HARQ-ACK mechanism is that when the transmission of the power saving indicator is aperiodic (such as, wake-up signal (WUS), GTS or aperiodic TRS/CSI-RS) the UE does not know the time and resource that the BS transmits power saving indicator. The UE may, therefore, not be able to generate the NACK for power saving indicator. Hence, it is advantageous that the UE only generates the ACK bit when the UE receives/detects the power saving indicator.

In some of the present implementations, the feedback for the power saving signal may be HARQ-ACK-only information. In these implementations, the UE may only generate the HARQ bit for the power saving signal when the UE successfully receives the power saving signal. Furthermore, the feedback may be transmitted when the UE receives a DCI format which may contain the information for activating/deactivating the power saving state.

The DCI format for triggering the power saving, in some of the present implementations, may contain the bit field related to activate/deactivate power saving state (similar to the NR DCI format). In other implementations, the DCI may have a different format for triggering the power saving. Some of the present implementations may provide different approaches to determine the time offset from the power saving signal to the corresponding HARQ feedback (i.e., DCI format, and the time offset may be started from the first/last symbol of the PDCCH).

In some of the present implementations, the time offset between the power saving DCI format and the corresponding HARQ feedback may be indicated by the index of the HARQ time offset value (i.e., the $K_1$) in the power saving DCI format, and the value may be configured by dl-DataToUL-ACK for the non-power saving state (e.g., configured in PUCCH-config). In some of the present implementations, the time offset may be indicated by the index of the HARQ time offset value (i.e., the $K_1$) in the power saving DCI format, and the value may be configured in the dl-DataToUL-ACK for the power saving state (e.g., configured in the power saving parameter configuration).

In some of the present implementations, the time offset may be a pre-defined value and the unit of this value may be milliseconds (ms), slots, or OFDM symbols (e.g., 4 ms, 4 slots, or 56 symbols). The value for time offset may depend on numerology of the data channel, the control channel, and/or the channel for power saving indicator of the HARQ feedback.

In some of the present implementations, the time offset between the power saving indicator and the HARQ feedback may be configured in the power saving indicator signal configuration of the RRC signaling. For example, there may be a HARQ time offset field in the power saving indicator signal configuration, and the unit of HARQ time offset may be in ms, slots, or OFDM symbols. In some of the present implementations, the time offset may be a pre-defined value in the specification (e.g., the $3^{rd}$ Generation Partnership Project (3GPP) Specification) and the unit of this value may be in ms, slots, or OFDM symbols (e.g., 4 ms or 4 slots or 56 symbols). The value for the time offset may depend on numerology of the data channel, the power saving indicator, and/or channel for power saving indicator of the HARQ feedback.

In some of the present implementations, a base station (e.g., a gNB) may schedule a PUSCH for the UE to transmit the NACK/ACK (N/A) for the power saving indicator reception. For instance, a DCI format 0_0 or 0_1, or a new power saving DCI format may be used (e.g., the power saving relating parameter may be appended to the DCI). In addition, the DCI may provide a PUSCH resource (such as the field in format 0_0 or 0_1) for the corresponding N/A transmission. Accordingly, the offset may be dynamically configured via the DCI.

In some of the present implementations, the feedback for the power saving signal may be HARQ-ACK/NACK information. In these implementations, the feedback may be transmitted when the UE receives a DCI format which contains information for activating/deactivating the power saving state. The DCI format may be a new DCI format for triggering power saving or an NR DCI for scheduling UL transmission (UL DCI) format (0_1 or 0_0) which may contain a bit field related to activate/deactivate power saving state. The UE may transmit the HARQ-ACK/NACK on the PUSCH resource that is scheduled by the new DCI format, or the NR UL DCI format (0_1 or 0_0) with the power saving indicator. In these implementations, the timing offset, the timing allocation, and the frequency allocation information for the HARQ-ACK/NACK information of the power saving signal may be included in the DCI.

In NR, the HARQ codebook used in the HARQ feedback may be generated based on the order of the PDSCH occasion (i.e., the receive timing of each PDSCH transmission), which is related to the cell index and the slot index for each PDSCH occasion. However, there is no corresponding PDSCH for the power saving signal and no mechanism for generating the HARQ codebook for the power saving signal. Some of the present implementations resolve this issue by including the HARQ feedback bit of the power saving signal into the HARQ codebook for the PDSCH.

Figure 4:
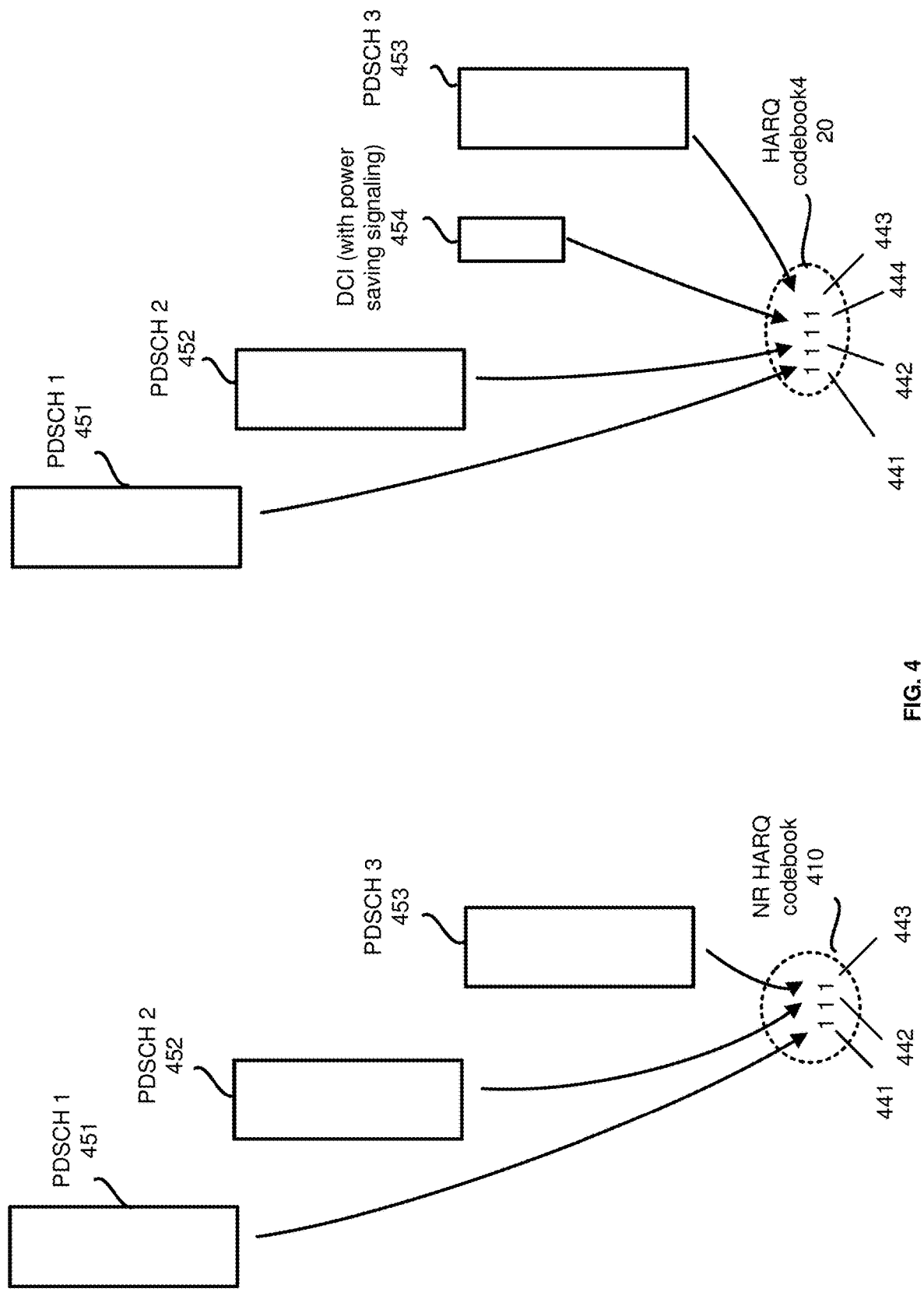
FIG. 4 a diagram illustrating the use of a bit in the HARQ codebook to acknowledge the receipt of the power saving signal, according to an example implementation of the present application.

FIG. 4 is a diagram illustrating the use of a bit in the HARQ codebook to acknowledge the receipt of the power saving signal, according to an example implementation of the present application. The figure shows both the HARQ codebook 410 for NR and the HARQ codebook 420 according to some of the present implementations. As shown, in NR, the HARQ codebook 410 includes bits 441, 442, and 443 for the PDSCHs 451, 452, and 453, respectively. There is no mechanism in the HARQ codebook 410 for the UE to acknowledge the receipt of the DCI that has the power saving signal.

As shown in FIG. 4, the HARQ codebook 420 according to some of the present implementations, includes an additional bit 444 for acknowledging the receipt of the power saving signal 454 (e.g., in DCI) by the UE. In some of the present implementations, for the location of the HARQ feedback bit 444 of the power saving signal 454 in the HARQ codebook 420, the UE may consider not only the occasion for the candidate PDSCH reception or the semi persistence scheduling (SPS) PDSCH release but also occasion/successful reception (the occasion may be for HARQ-ACK/NACK case and the successful reception may be for the HARQ-ACK only case) of the power saving signal 454 when the UE determines and generates the HARQ feedback bits 441, 442, 443, and 444 of the HARQ codebook 420. These implementations follow the same rule for the power saving signal and other channels.

Some of the present implementations may use a different location for the HARQ-ACK-only bit for the power saving indicator. In these implementations, when the UE determines and generates the HARQ feedback bits of the HARQ codebook, the UE may set the HARQ feedback bit of power saving signal as the least significant bit (LSB) or as the most significant bit (MSB) of the HARQ codebook. These implementations mitigate the impact of the UE missing the power saving signal.

When the UE receives more than one power saving signal for a HARQ codebook in a transmission of PUCCH, the UE may locate each HARQ feedback bit of the power saving signal based on the cell index and the slot index and the starting point of the first bit may be the LSB/MSB of a HARQ codebook. In some cases, the UE may assume there is only one power saving signal and/or corresponding HARQ feedback bit for a HARQ codebook in a transmission of the PUCCH. In these cases, the UE may only consider the first power saving signal as a valid power saving signal and may transmit the corresponding HARQ feedback bit for the first power saving signal. The BS may allocate more resources for the HARQ feedback since the UE may mis-detect the power saving signal, and the BS may need to have the capability to decode the HARQ feedback from the UE when the UE mis-detects the power saving signal.

In some of the present implementations, the power saving indicator may be configured with a dedicated PUCCH resource for the HARQ feedback. In these implementations, the UE may not consider other HARQ feedback bits (i.e., for the PDSCH reception or the SPS PDSCH release) on the dedicated PUCCH resource. Furthermore, in these implementations, the $K_1$ timing set to determine for the UE for a set of occasions for power saving signal may be different from the K timing set for the candidate PDSCH receptions or the SPS PDSCH releases. Accordingly, the UE may generate an independent HARQ codebook for the PDSCH receptions/SPS PDSCH releases and the power saving signal. The UE may generate the HARQ feedback bit of one HARQ codebook for the PDSCH receptions/SPS PDSCH releases and may consider only possible occasion of PDSCH receptions/SPS PDSCH releases according to the pseudo code in specification.

Similarly, the UE may generate the HARQ feedback bit of another HARQ codebook for the power saving signal and may consider only possible occasion/successful reception of power saving signal according to the pseudo code in specification. These implementations facilitate the implementation of the HARQ feedback for the power saving signal since the UE may not be affected by the miss detection of the power saving signal. In some of these implementations, if the dedicate PUCCH resource for the power saving signal overlaps with the PUCCH of the PDSCH receptions/SPS PDSCH releases, the UE may multiplex the HARQ feedback information for the power saving indicator into the HARQ feedback information for the PDSCH receptions/SPS PDSCH releases. The HARQ feedback information for the power saving signal may be appended to the LSB or the MSB side of the HARQ feedback information for the PDSCH receptions/SPS PDSCH releases in the multiplexed uplink control information (UCI).

The above approach may also be applied for the HARQ ACK/NACK feedback. The UE may generate the ACK when the UE has successfully received the power saving signal. The UE may generate the NACK when the UE fails to receive the power saving signal on every possible occasion of the power saving signal reception. This approach may cause some overhead for the UE to transmit the HARQ feedback information for the power saving indicator. For example, consider the cases where the power saving indicator is periodically transmitted in the periodic TRS/CSI-RS, or the UE is configured with search space periodicity for monitoring power saving indicator DCI/RNTI. In these cases, if the DCI format for the power saving indicator is transmitted every 10 ms, the UE has to generate one bit of HARQ feedback information every 10 ms.

The above mentioned implementations may be applied to the code block group (CBG) based HARQ codebook. The difference between the CBG based and the transport block (TB) based HARQ codebooks is that the HARQ feedback bits for the PDSCH receptions are generated per TB for the TB based HARQ codebook generation, but the HARQ feedback bits for the PDSCH receptions are generated per CBG for CBG based HARQ codebook generation. These implementations may be used for the semi-static HARQ codebook. The HARQ feedback for the power saving indicator when the UE applies the dynamic HARQ codebook, in some implementations, may be handled by the downlink assignment index (DAI).

Some of the present implementations may provide a mechanism for the default beam operation of the UE in the power saving state. In NR, the default UL beam behavior of the PUSCH is that if the PUSCH is scheduled by the DCI format 0_0 (i.e., fallback UL DCI format) on a cell, the UE shall transmit the PUSCH according to the spatial domain filter corresponding to the PUCCH resource with the lowest ID within the active UL BWP of the cell. However, it is possible that the PUCCH resource with the lowest ID may be associated with a deactivated UE antenna panel when the UE enters the power saving state. In order to overcome this shortcoming, some of the present implementations provide an enhancement for the default beam selection rule in the power saving state.

Figure 5:
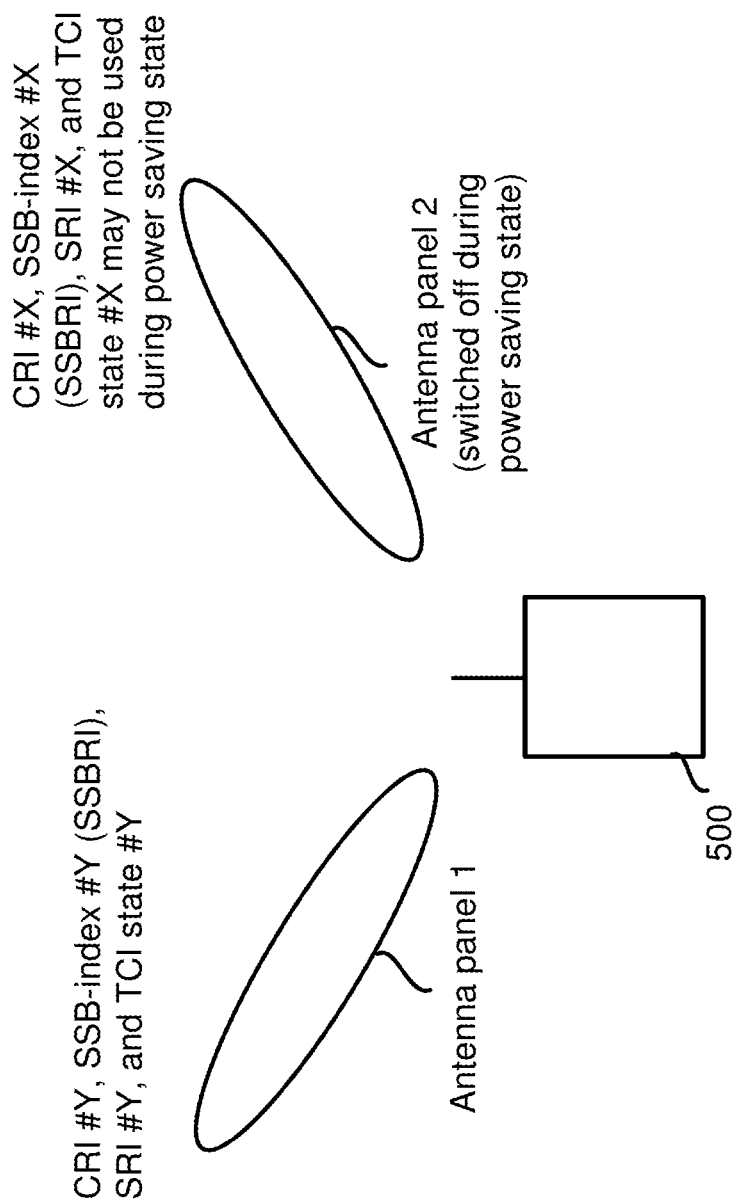
FIG. 5 is a diagram illustrating the default beam operation of a UE for the power saving state, in accordance with an example implementation of the present disclosure.

FIG. 5 is a diagram illustrating the default beam operation of a UE 500 for the power saving state, in accordance with an example implementation of the present disclosure. Each of the UE's antenna panel 1 and antenna panel 2 may be associated with one or more TCI states/reference signals (e.g., CSI-RSs, synchronization signal blocks (SSBs) and/or sounding reference signals (SRSs)). For example, the UE antenna panel 1 may be associated with SRS 1 and SRS 2, and the UE antenna panel 2 may be associated with the SRS 3 and SRS 4

With reference to FIG. 5, if the UE is indicated to only keep the antenna panel 1 active and deactivate the antenna panel 2, then UE may only perform transmission with the spatial domain filter corresponding to SRS 1 or SRS 2 that are associated with the active antenna panel 1.

In some cases, each SRS resource set may be considered as a UE antenna panel. In these cases, activating/configuring only the SRS resource set 1 may result in the UE being able to perform transmission for all UL channels (e.g., PUSCH, PUCCH) or UL reference signals (e.g., phase tracking reference signal (PTRS), SRS, DMRS) with the spatial domain filter corresponding to SRS 1 or SRS 2. As another example, the UE antenna panel 1 may be associated with the transmission configuration indication (TCI) state 1 (e.g., may be indicated to RS, CS-RS resource indication #1 (CRI #1)) and TCI state 2 (e.g., may be indicated to RS, synchronization signal block #1 (SSB #1)), and the UE antenna panel 2 may be associated with the TCI state 3 (e.g., may be indicated to RS, CRI #2) and TCI state 4 (e.g., may be indicated to RS, SSB #2).

It is noted that the panel association to the TCI state(s) means that the target of RS resource transmitted to or received from that panel may have the same quasi co location-ed (QCL-ed) assumption with the reference RS resource by means of the TCI indication. If the UE is indicated to only keep the antenna panel 1 active and to deactivate the antenna panel 2, then the UE may only perform transmission with the spatial domain filter corresponding to the TCI state 1 or TCI state 2. In some cases, each SRS resource set may be regarded as a UE antenna panel and only the SRS resource set 1 may be activated/configured. Furthermore, the UE may only perform transmission for all UL channels (e.g., PUSCH, PUCCH) or the UL reference signals (e.g., PTRS, SRS, DMRS) with the spatial domain filter corresponding to the TCI state 1 or the TCI state 2, which may or may not under beam correspondence assumption.

In some of the present implementations, the UE may only consider the PUCCH resource with a valid (or applicable) spatial domain information/QCL information. Examples of the valid/applicable spatial domain information/QCL information may include the SpatialRelationInfo parameter associated the RRC parameter in the UL channel/signal configuration IE and/or the QCL-info in TCI-state configuration IE. This information may be indicated by the medium control access-control element (MAC-CE) (e.g., the PUCCH spatial relation Activation/Deactivation MAC-CE) or by the DCI when the UE determines the lowest ID of the PUCCH resource for default spatial domain filter of the PUSCH.

The valid/applicable spatial domain filter information/QCL information means this spatial domain filter information/QCL information corresponds/relates/associates to an activated UE antenna panel/SRS resource set. The spatial domain filter information may come from the CRI, SSB-index (i.e., SSBRI), SRS resource indicator (SRI), TCI state, and/or other reference signals index. When the antenna panel/SRS resource set are deactivated/turned off, all the associated spatial domain information/QCL information are invalid/inapplicable.

In some of the present implementations, the TCI state or the spatial domain filter for the PUSCH, which is scheduled by the DCI format 0_0, may be based on the spatial domain filter/QCL information of the control resource set (CORESET) that contains the DCI format 0_0 when the UE is in the power saving state. For example, if the CORESET that contains the DCI format 0_0 is configured with the TCI state "CRI #1", the corresponding PUSCH scheduled by the DCI format 0_0 may also be transmitted by the spatial domain corresponds to "CRI #1". The UE may have different default UL beam behavior of PUSCH for non-power saving state and power saving state. The UE may not expect the spatial domain filter of the CORESET containing DCI format 0_0 associates to a deactivated antenna panel/SRS resource set.

In some of the present implementations, the default UL DCI format may contain the SRI to indicate the spatial domain filter for the PUSCH scheduled by the DCI format 0_0 to the UE when the UE is in the power saving state. The UE may have a different default UL beam behavior for the PUSCH for the power saving and non-power saving states. In other implementations, some bit fields of DCI format 0_0 may be re-interpreted as the SRS resource indicator when the UE enters the power saving state.

The UE, in some of the present implementations, may not expect that the PUCCH resource with lowest ID to be associated with an invalid spatial domain information/TCI state (e.g., SpatialRelationInfoId) in the MAC-CE/RRC signaling, and the invalid spatial domain information/TCI state represents the spatial domain filter associates to a deactivated UE antenna panel. In these implementations, the UE may not transmit the PUCCH until the UE receives the RRC reconfiguration or the MAC-CE to associate the PUCCH with the lowest ID to a valid spatial domain filter. In some of these implementations, the UE selects a spatial domain filter when the PUCCH resource with the lowest ID is associated with an invalid spatial domain information/TCI state (e.g., SpatialRelationInfoId) in MAC-CE/RRC signaling.

For the DL default beam case, the UE may not expect the DM-RS ports of the PDSCH of a serving cell to be quasi co-located with the RS(s) in an invalid TCI state with respect to the QCL parameter(s). The QCL parameters may be used for PDCCH quasi co-location indication of the CORESET that is associated with a monitored search space with the lowest CORESET-ID in the latest slot in which one or more CORESETs within the active BWP of the serving cell are configured monitored by the UE. The invalid TCI states are the TCI states that are associated with a deactivated antenna panel.

Similarly, if a UE does not have a dedicated PUCCH resource configuration provided by the higher layer parameter PUCCH-ResourceSet in the PUCCH-Config, a PUCCH resource set may be provided by the higher layer parameter PUCCH-ResourceCommon in SystemInformationBlockType1 for transmission of the HARQ-ACK information on the PUCCH in an initial active UL BWP provided by the SystemInformationBlockType1. The PUCCH resource set may be provided by the higher layer parameter PUCCH-Resource-Common and may include resource allocation information such as, a PUCCH format, a first symbol, a duration, a PRB offset, and a cyclic shift index set for a PUCCH transmission.

If a UE does not have a dedicated PUCCH resource configuration provided by higher layer parameter PUCCH-ResourceSet in PUCCH-Config, the UE may transmit the PUCCH using the same spatial domain transmission filter as for the MSG3 PUSCH transmission. If the spatial domain transmission filter of the MSG3 PUSCH becomes invalid/inapplicable (e.g., due to deactivation of antenna panel or UE enters power saving state), the UE may select a transmission filter.

In some of the present implementations, the spatial domain filter for the PUCCH, when UE does not have dedicated PUCCH resource configuration, may be the spatial domain information of the CORESET with the lowest CORESET ID among all the CORESETs which are with spatial domain information/QCL information which associates with the active antenna panel(s)/SRS resource set(s). For example, the CORESET #1 may be associated with the TCI state "CRI #1", the CORESET #2 may be associated with the TCI state "CRI #2", the CORESET #3 may be associated with the TCI state "CRI #3", the TCI state "CRI #1" may be associated with the antenna panel 1, and the TCI state "CRI #2" and the TCI state "CRI #3" may be associated with antenna panel 2. If the UE receives a power saving indicator to turn off antenna panel 1, the UE may transmit the PUCCH resource configured in PUCCH-ResourceCommon with the spatial domain filter corresponding to the TCI state "CRI #2" since the CORESET #2 is the CORESET with lowest ID associated with the antenna panel 2.

Figure 6:
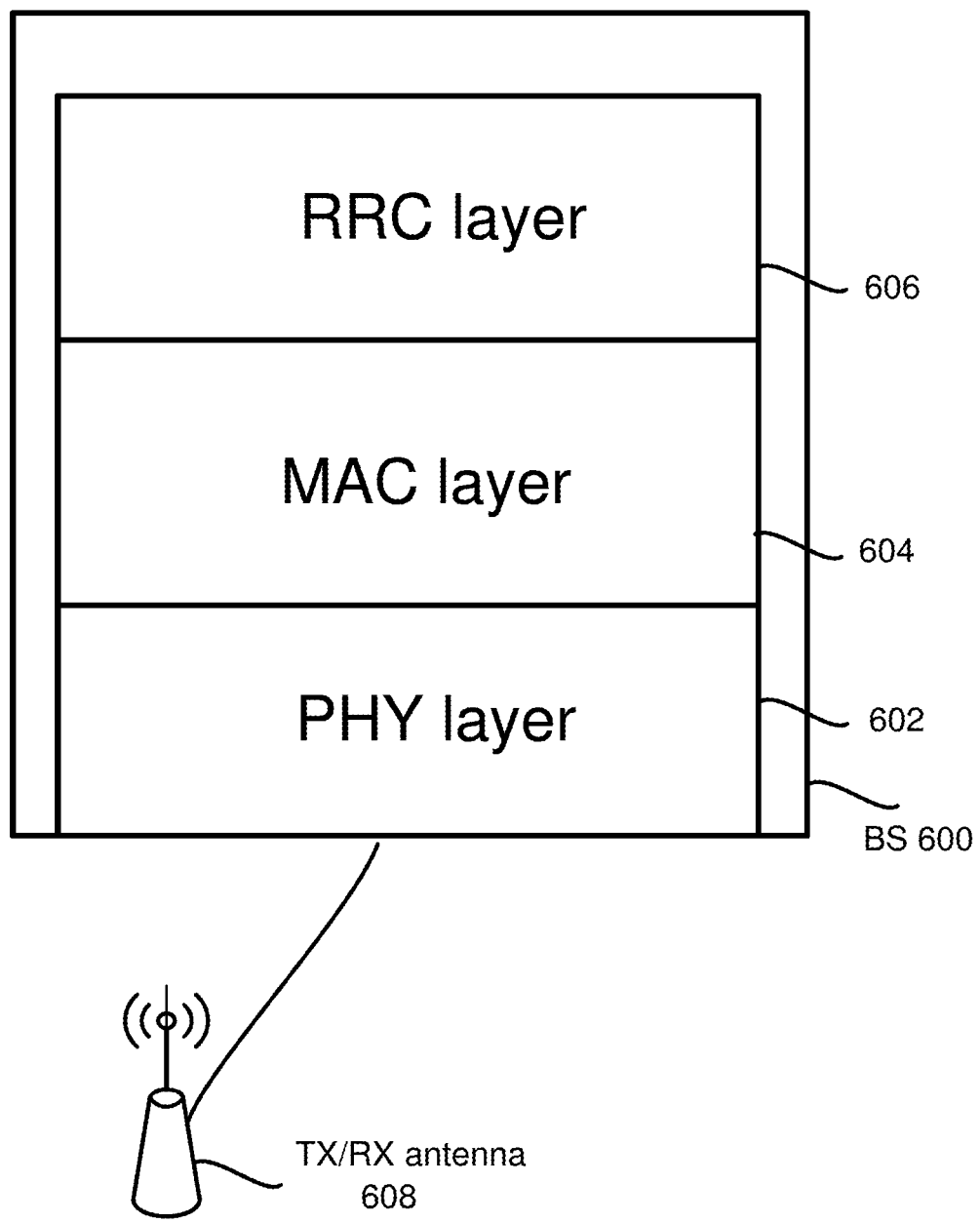
FIG. 6 is a schematic diagram illustrating an example architecture of a base station, in accordance with an example implementation of the present disclosure.

FIG. 6 is a schematic diagram illustrating an example architecture of a base station, in accordance with an example implementation of the present disclosure. As shown in FIG. 6, the BS 600 may include a protocol stack that contains, among other protocol layers, a Physical (PHY) layer 602, a MAC layer 604 and an RRC layer 606. The BS 600 may further include a controller (not shown), such as a processor or a microcontroller, to coordinate the activities of various layers of the BS 600. In addition, the PHY layer 602 may be coupled to at least one transceiver/receiver point (TRP) 608.

The TRP 608 may be a macro-cell, a small-cell, a pico-cell, a femto-cell, a Remote Radio Head (RRH), a relay node, or a combination of antenna panels, which may be deployed anywhere, such as in the interior of a room, in/on a building, on top of a house or streetlamps, etc.

Figure 7:
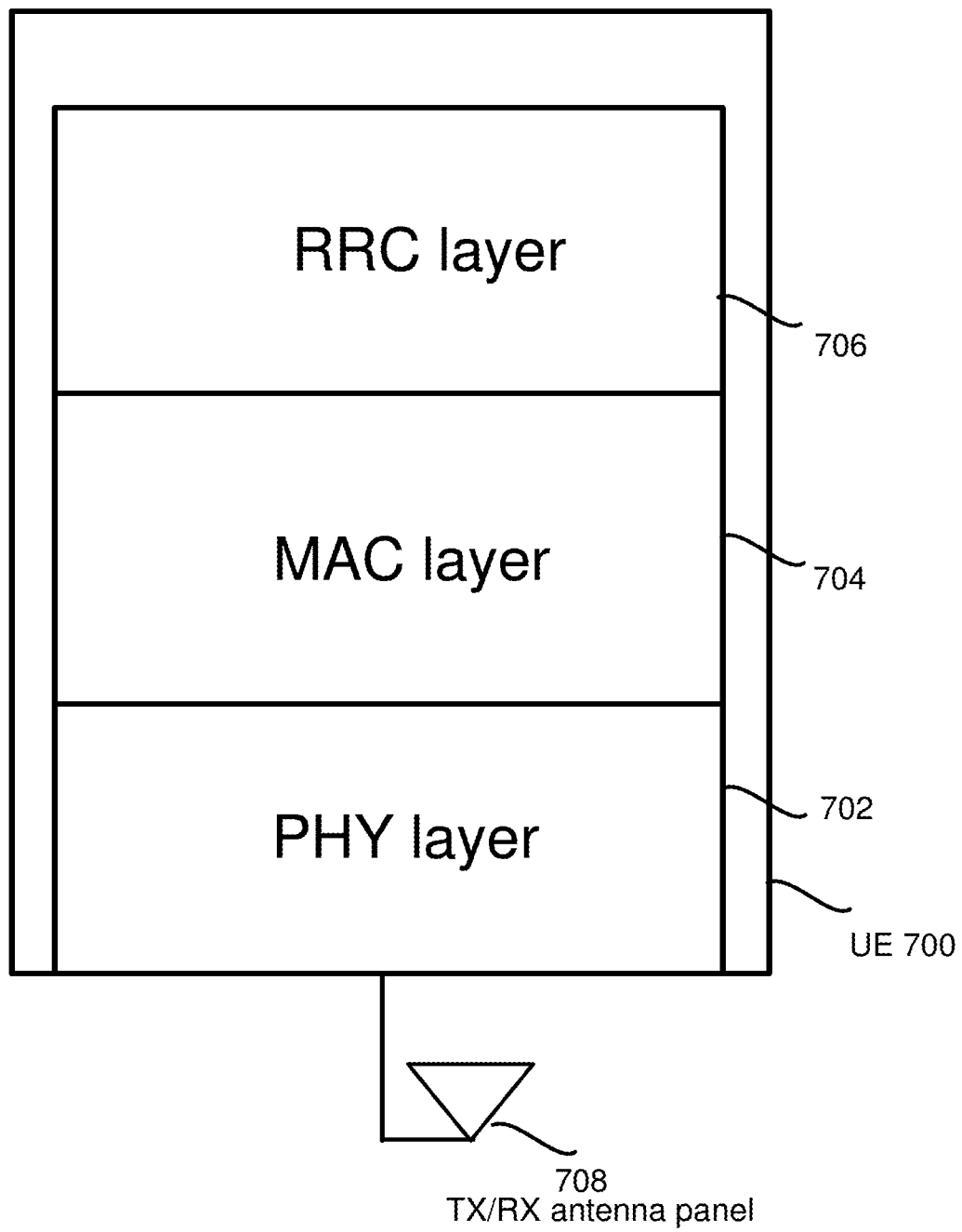
FIG. 7 is a schematic diagram illustrating an example architecture of a UE, in accordance with an example implementation of the present disclosure.

FIG. 7 is a schematic diagram illustrating an example architecture of a UE, in accordance with an example implementation of the present disclosure. As shown in FIG. 7, a UE 700 may include a protocol stack that contains, among other protocol layers, a PHY layer 702, a MAC layer 704, and an RRC layer 706. The UE 700 may further include a controller (not shown,) such as a processor or microcontroller, to coordinate the activities of various layers of the UE 700.

As shown, the PHY layer 702 may be coupled with the TX/RX antenna panel 708. The controller of the UE 700 may set and coordinate the PHY layer 702, the MAC layer 704, and the RRC layer 706 based on the received signals from the TX/RX antenna panel 708. The controller of the UE 700 may set the PHY layer 702, the MAC layer 704, and the RRC layer 706 based on the received signaling from the BS 600.

In some of the present implementations, the RRC layer 706 may be configured by the BS 600 with the $K_1$ timing set {1,2,3,4,5,6,7,8 slots} in the PUCCH-config for the non-power saving state. The RRC layer 706 may be configured by the BS 600 with the power saving state parameter, which may include a $K_1$ value of {8 slots}. The BS 600 may transmit the PDSCH on the slots n+2 and n+4 to the UE 700.

The UE 700 may then receive a power saving indicator on the slot n+4 and may transmit the HARQ feedback for the PDSCH on the PUCCH resource in the slot n+8. Since the UE enters the power saving state on the slot n+4, the $K_1$ timing set for determining the PDSCH occasion becomes {8 slots}. Since the slot that is 8 slots before the slot n+8 is slot n, (which is before the UE 700 enters the power saving state), the UE 700 may not generate the HARQ feedback bit for the PDSCH reception on slot n. This implementation may be advantageous since the BS 600 may not consider the triggering power saving state at the time the BS 600 transmits PDSCH. As a result, the $K_1$ time value for the power saving state may not correspond to a valid PDSCH reception.

In some of the above-mentioned implementations, the RRC layer 706 has be configured by BS 600 with the $K_1$ set {1,2,3,4,5,6,7,8, slots} in the PUCCH-config for the non-power saving state. The RRC layer 706 has be configured by BS 600 with power saving state parameter which includes a K1 value {8,9 slots}. The BS 600 transmits the PDSCH on the slots n+3 and n+4 to the UE 700.

The UE 700 may then receive a power saving indicator on the slot n+7 and may transmit the HARQ feedback for the PDSCH on PUCCH resource in the slot n+8. Since the UE enters the power saving state on the slot n+6, the $K_1$ timing set for determining the PDSCH occasion becomes the union of the $K_1$ set for the power saving state and the non-power saving state. The new $K_1$ timing set for determining the PDSCH occasion when applying pseudo code is {1,2,3,4,5,6,7,8,9 slots}.

The UE 700 may check every value in the $K_1$ set in a descending order of the slot timing values to find whether or not there is a valid PDSCH transmission. The only valid and successful PDSCH transmissions are on the slots n+3 and n+4 based on the PDSCH time allocation configuration (i.e., PDSCH-TimeDomainResourceAllocationList). Accordingly, the HARQ feedback bit in these implementations may be {1,1} if the BS 600 configures only one codeword transmission.

In some of the present implementations, the power saving parameter configuration may not include the $K_1$ set configuration. In these implementations, the UE 700 may assume that the $K_1$ set for the power saving state is the same as the $K_1$ set for the non-power saving state, which is {1,2,3,4,5,6,7,8 slots}. The BS 600 may transmit the PDSCH on the slots n+3 and n+4 to the UE 700. The UE 700 may then receive a power saving indicator on the slot n+7 and may transmit the HARQ feedback for the PDSCH on PUCCH resource in the slot n+8.

Since the UE 700 enters the power saving state on the slot n+6, the $K_1$ timing set for determining the PDSCH occasion may be kept the same as {1,2,3,4,5,6,7,8 slots}. The UE 700 may check every value in the $K_1$ set in a descending order of the slot timing values to find whether or not there is a valid PDSCH transmission. The only valid and successful PDSCH transmissions are on the slots n+3 and n+4 on the PDSCH time allocation configuration (i.e., PDSCH-TimeDomainResourceAllocationList). The HARQ feedback bit in this approach may be {1,1} if the BS 600 configures only one codeword transmission.

In some of the present implementations, the $K_1$ set configuration may be in the power saving parameter configuration. The BS 600 may transmit the PDSCH on the slots n+3 and n+4 to the UE 700. The UE 700 may then receive a power saving indicator on the slot n+7 and may transmit the HARQ feedback for PDSCH on the PUCCH resource in the slot n+8. Since the UE 700 enters the power saving state on the slot n+6, the UE has to check all values in the $K_1$ set to determine whether all values are the same as the $K_1$ set for non-power saving state. If the $K_1$ timing set for the power saving state is {1,2,3,4,5,6,7,8 slots}, which is the same as for non-power saving state, the UE 700 may apply the pseudo code to determine the PDSCH transmission occasion. If the $K_1$ set for the power saving state is {6 slots}, which is different from the $K_1$ set for non-power saving state, the UE 700 may not generate the HARQ feedback bit for the PDSCH reception in the slots n+3 and n+4 since they are received before the UE enters the power saving state.

In some of the present implementations, the RRC layer 706 may be configured by the BS 600 with the $K_1$ timing set {1,2,3,4,5,6,7,8 slots} in the PUCCH-config for the non-power saving state. The RRC layer 706 may be configured by the BS 600 with the power saving state parameter which includes a $K_1$ value {8 slots}.

The BS 600 may transmit the PDSCH to the UE 700 on the slots n+2 and n+5. The UE 700 may receive a new DCI format which contains the power saving indicator on the slot n+4 and may transmit the HARQ feedback for the PDSCH on the PUCCH resource in the slot n+8. Since the UE 700 enters the power saving state on the slot n+4, the $K_1$ timing set for determining PDSCH occasion may be the $K_1$ set for power saving state. The $K_1$ set for the power saving state may be the union of the $K_1$ set for non-power saving state and power saving state, which is {1,2,3,4,5,6,7,8}. The UE 700 may check every value in the $K_1$ set in a descending order of the slot timing values to determine whether there is a valid PDSCH transmission or a power saving indicator. There may only be a valid and successful PDSCH transmission on the slot n+5, but the UE 700 may fail to receive the PDSCH transmission on the slot n+2. The HARQ feedback bit may, therefore, be {0,1,1} if the BS 600 configures only one codeword transmission. The "0" is the MSB and the first "1" is for the successful reception of power saving indicator. If the UE 700 fails to receive the power saving indicator, the HARQ feedback bit may be {0,1} where the "1" is for successful PDSCH reception on the slot n+5.

In some of the present implementations, the RRC layer 706 may be configured by the BS 600 with the power saving state parameter which may include a $K_1$ value of {3,4 slots}. The BS 600 may transmit the PDSCH on the slots n+2 and n+5 to the UE 700. The UE 700 may receive a new DCI format which may contain the power saving indicator on the slot n+4 and may transmit the HARQ feedback for the PDSCH on the PUCCH resource in the slot n+8. Since the UE 700 enters the power saving state on the slot n+4, the $K_1$ timing set for determining the PDSCH occasion may be the $K_1$ set for the power saving state.

In these implementations, the $K_1$ set is the $K_1$ set of the power saving state, which is {3,4 slots}. The UE 700 may check every value in the $K_1$ set in a descending order of the slot timing values to find whether there is a valid PDSCH transmission or a power saving indicator. The valid and successful PDSCH transmission are on the slots n+2 and n+5, but the $K_1$ set for the power saving state is {3,4 slots}. Therefore, the HARQ feedback for the PDSCH on slot n+2 may not be generated, and the HARQ feedback bit in these implementations may be {1,1} if the BS 600 configures only one codeword transmission. The first "1" is the MSB for successful power saving indicator reception and the second "1" is the LSB for successful reception of PDSCH transmission on the slot n+5. If the UE 700 fails to receive the power saving indicator, the HARQ feedback bit may be {1} where the "1" is for successful PDSCH reception on slot n+5.

In some of the present implementations, the RRC layer 706 may not be configured by the BS 600 with the $K_1$ set in the power saving state parameter. The BS 600 may transmit the PDSCH on the slots n+2 and n+5 to the UE 700. The UE 700 may then receive a new DCI format which contains the power saving indicator on the slot n+4, and may transmit the HARQ feedback for the PDSCH on the PUCCH resource in the slot n+8.

Since the UE enters the power saving state on the slot n+4 without the $K_1$ timing set for the power saving state, the $K_1$ timing set for determining the PDSCH occasion may remain the same as the $K_1$ set for the non-power saving state, which is {1,2,3,4,5,6,7,8 slots}. The UE 700 may check every value in the $K_1$ set in a descending order of the slot timing values to find whether there is a valid PDSCH transmission or a power saving indicator. The valid and successful PDSCH transmission may only be on the slots n+2 and n+5 on the PDSCH time allocation configuration (i.e., PDSCH-TimeDomainResourceAllocationList parameter). The HARQ feedback for the PDSCH and the power saving indicator in these implementations may, therefore, be {1,1,1} if the BS 600 configures only one codeword transmission. The first "1" is the MSB for successful PDSCH reception on slot n+2 and the second "1" is for successful reception of power saving indicator on slot n+4. If the UE 700 fails to receive the power saving indicator, the HARQ feedback bit may be {1,1}, where the second "1" is for successful PDSCH reception on slot n+5.

In some of the present implementations, the BS 600 may not configure the RRC layer 706 with the $K_1$ set in the power saving state parameter. In these implementations, the slot timing offset for the HARQ feedback of the power saving indicator may be defined as "4 slots" in the specification. The BS 600 may transmit the PDSCH on the slots n+2 and n+5 to the UE 700.

The UE 700 may then receive a new DCI format which may contain the power saving indicator on the slot n+4, and may transmit the HARQ feedback for the PDSCH on the PUCCH resource in the slot n+8. Since the UE 700 enters the power saving state on the slot n+4 without the $K_1$ timing set for the power saving state, the $K_1$ timing set for determining the PDSCH occasion may remain the same as the $K_1$ set for the non-power saving state, which is {1,2,3,4,5,6,7,8 slots}.

The UE 700 may check every value in the K1 set in a descending order of the slot timing values and a predefined value (e.g., "4 slots") before the slot n+8 to find whether there is a valid PDSCH transmission or a power saving indicator. The valid and successful PDSCH transmission may be on the slots n+2 and n+5. The HARQ feedback for the PDSCH and power saving indicator in this approach may, therefore, be {1,1,1} if the BS 600 configures only one codeword transmission. The first "1" is the MSB for successful PDSCH reception on slot n+2 and the second "1" is for successful reception of power saving indicator on slot n+4.

If the UE 700 fails to receive the power saving indicator, the HARQ feedback bit may be {1,1}, where the second "1" is for the successful PDSCH reception on the slot n+5. When the HARQ feedback of the power saving indicator is defined in specification to be "6 slots," the HARQ feedback bit of the power saving indicator may be generated earlier than the HARQ feedback bit for the PDSCH reception in the slot n+2. Accordingly, if the HARQ bit set is {1,1,1}, the first bit may be for the power saving indicator and the second bit may be for the successful PDSCH reception on the slot n+2. In some of the present implementations, the HARQ feedback bit for the power saving indicator may be generated later than the HARQ feedback bit for the successful PDSCH reception on the slot n+2.

In some of the present implementations, the HARQ feedback may be located on the MSB of the HARQ feedback bit set. The RRC layer 706 may not be configured by the BS 600 with the $K_1$ set in the power saving state parameter, but the slot timing offset for the HARQ feedback of the power saving indicator may be defined in specification as "4 slots." The BS 600 may transmit the PDSCH on the slots n+2 and n+5 to the UE 700. The UE 700 may then receive a new DCI format, which may contain the power saving indicator on the slot n+4. The UE 700 may transmit the HARQ feedback for the PDSCH on the PUCCH resource in the slot n+8.

Since the UE 700 enters the power saving state on the slot n+4 without the $K_1$ timing set for the power saving state, the $K_1$ timing set for determining the PDSCH occasion may remain the same as the $K_1$ set for the non-power saving state, which is {1,2,3,4,5,6,7,8 slots}. The UE 700 may check every value in the $K_1$ set in a descending order of the slot timing values and a predefined value (e.g., "4 slots") before the slot n+8 to find whether there is a valid PDSCH transmission or a power saving indicator. There is a valid and successful PDSCH reception on the slot n+2 on the PDSCH time allocation configuration (i.e., PDSCH-Time- DomainResourceAllocationList parameter), but the UE may fail to receive the PDSCH on the slot n+5.

The HARQ feedback for the PDSCH and power saving indicator in these implementations may, therefore, be {1,1,0} if the BS 600 configures only one codeword transmission. The first "1" may be the MSB for the successful power saving indicator reception on slot n+4, and the second "1" may be for the successful reception of the power saving indicator on the slot n+2. If the UE fails to receive the power saving indicator, the HARQ feedback bit may be {1,0}, where the "0" is for the failed PDSCH reception on slot n+5.

In some of the present implementations, the HARQ feedback may be located on the LSB of the HARQ feedback bit set. The BS 600 may not configure the RRC layer 706 with the $K_1$ set in the power saving state parameter, but the slot timing offset for the HARQ feedback of the power saving indicator may be defined in the specification as "4 slots."

The BS 600 may transmit the PDSCH on the slots n+2 and n+5 to the UE 700. The UE 700 may then receive a new DCI format, which may contain the power saving indicator on the slot n+4. The UE 700 may transmit the HARQ feedback for the PDSCH on the PUCCH resource in the slot n+8. Since the UE 700 enters the power saving state on the slot n+4 without the $K_1$ timing set for the power saving state, the $K_1$ timing set for determining the PDSCH occasion may remain the same as the $K_1$ set for the non-power saving state, which is {1,2,3,4,5,6,7,8 slots}.

The UE 700 may check every value in the $K_1$ set in a descending order of the slot timing values and a predefined value (e.g., "4 slots") before the slot n+8 to find whether there is a valid PDSCH transmission or a power saving indicator. The valid and successful PDSCH transmission may be on slot n+2, but the UE may fail to receive the PDSCH on the slot n+5. The HARQ feedback for the PDSCH and the power saving indicator in these implementations may, therefore, be {1,0,1} if the BS 600 configures only one codeword transmission. The first "1" may be the MSB for the successful PDSCH reception on slot n+2, and the second "1" may be the LSB for the successful reception of power saving indicator on slot n+2. If the UE 700 fails to receive the power saving indicator, the HARQ feedback bit may be {1,0}, where the "0" may correspond to the failed PDSCH reception on the slot n+5.

In some of the present implementations, the BS 600 may configure the RRC layer 706 with the $K_1$ timing set {1,2,3,4,5,6,7,8 slots} in the PUCCH-config for the non-power saving state. The BS 600 may configure the RRC layer 706 with the power saving state parameter which includes dedicated PUCCH resource for HARQ feedback of power saving indicator, and the slot timing offset for HARQ feedback of power saving indicator may be defined in the specification as "4 slots."

The BS 600 may transmit the PDSCH on the slots n+2 and n+5 to the UE 700. The UE 700 may then receive a new DCI format, which may contain the power saving indicator on the slot n+4. The UE 700 may transmit the HARQ feedback for the PDSCH on the PUCCH resource in the slot n+7. Since the UE 700 receives the power saving state on the slot n+4 and the timing offset from the power saving indicator to the dedicated HARQ feedback is "4 slots", the UE 700 may transmit the HARQ feedback for the power saving indicator on the slot n+8.

For the HARQ feedback of the PDSCH reception, the UE 700 may check every value in the $K_1$ set in a descending order of the slot timing values to find whether there is a valid PDSCH transmission or a power saving indicator. The valid and successful PDSCH transmission may only be on the slot n+5, but the UE 700 may fail to receive the PDSCH transmission on the slot n+2. The HARQ feedback bit in these implementations my, therefore, be {0,1} on the PUCCH of slot n+7 if the BS 600 configures only one codeword transmission. The HARQ feedback bit for the power saving indicator may be {1} on the dedicated PUCCH of the slot n+8 if the UE 700 successfully receives the power saving indicator on the slot n+4. In some of these implementations, the UE 700 may be indicated to transmit the HARQ feedback for the PDSCH on the slot n+8. As a result, the PUCCH resource for the HARQ feedback for the PDSCH reception may be overlapped with the PUCCH resource for the HARQ feedback for the power saving indicator reception.

After generating the HARQ feedback bit for the PDSCH reception and the power saving indicator, which are {0,1} and {1} respectively, the UE 700 may multiplex the HARQ bit for the power saving indicator on the MSB side of the HARQ feedback bit for the PDSCH reception. The HARQ feedback bit on the PUCCH resource for the PDSCH reception may, therefore, be {1,0,1}. In some of the present implementations, the UE 700 may multiplex the HARQ bit for the power saving indicator on the LSB side of the HARQ feedback bit for the PDSCH reception. In these implementations, the HARQ feedback bit on the PUCCH resource for PDSCH reception may be {0,1,1}.

In some of the present implementations, the UE 700 may be configured to monitor the power saving indicator (both the DCI based or the signal based) for every 5 slots starting from the slot n+2 (e.g., with an offset value of "2 slot"). The RRC layer 706 may be configured by the BS 600 with the $K_1$ timing set {1,2,3,4,5,6,7,8 slots} in the PUCCH-config for the non-power saving state. The BS 600 may configure the RRC layer 706 with the power saving state parameter which includes the $K_1$ timing set {8,9 slots} for the HARQ feedback of the power saving indicator.

The BS 600 may transmit the PDSCH on the slots n+2 and n+5 to the UE 700. The UE 700 may then receive a new DCI format, which may contain the power saving indicator on the slot n+4. The UE 700 may transmit the HARQ feedback for the PDSCH on the PUCCH resource in the slot n+8. The UE 700 may successfully receive the power saving indicator on the slot n+7 but may fail to receive the power saving indicator on the slot n+2. Since the UE 700 enters the power saving state after the slot n+7, the $K_1$ timing set for determining the PDSCH reception and the power saving indication reception may be {1,2,3,4,5,6,7,8,9 slots}.

In this example, the union $K_1$ set may be used and the UE 700 may transmit the HARQ feedback for the power saving indicator on the slot n+8. The UE 700 may check every value in the $K_1$ set in a descending order of the slot timing values for the power saving indicator to find out whether there is a valid PDSCH transmission or a power saving indicator. In this example, the only valid and successful PDSCH transmission is on the slot n+5, but the UE 700 may fail to receive the PDSCH transmission on the slot n+2.

The HARQ bit for this example may be {0,0,1,1} if the HARQ feedback bit for the power saving indicator is generated earlier than the HARQ feedback for the PDSCH reception, where the first "0" is for the failed reception of the power saving indicator on the slot n+2, the second "0" is for the failed reception of the PDSCH on the slot n+2, the first "1" is for the successful reception of the power saving indicator on the slot n+7. In some of the present implementations, when the power saving indicator is generated later than the HARQ feedback for the PDSCH reception, the HARQ bit for may be {0,0,1,1}, where the first "0" is for the failed reception of PDSCH on slot n+2, the second "0" is for the failed reception of power saving indicator on slot n+2, and the first "1" is for successful reception of PDSCH on slot n+7.

In some of the present implementations, the power saving indicator may be a CSI-RS which may be configured in the power saving parameter configuration. The monitor occasion for the power saving indicator may be defined as a fixed offset before the PDCCH monitor occasion. For example, the UE 700 may be configured to monitor the PDCCH every 10 slots starting from the slot n+1 followed by the slot n+11 (using an offset of "1 slot"), etc.

The UE 700 may need to monitor the power saving indicator on the 10th symbol on the slot n and the 10th symbol on the slot n+9 which is based on "4 symbols" offset before the first symbol of the PDCCH monitor occasion. In some of the present implementations, the power saving indicator may be a CSI-RS which may be configured in the power saving parameter configuration with a monitor periodicity. For example, the UE 700 may be configured to monitor power saving indicator every 10 slots.

In some of the present implementations, the power saving indicator may be an RS-based or DCI-based signal, and the transmission/monitoring parameter may be configured in the power saving parameter configuration. The UE 700 may start monitoring the power saving indicator after the UE 700 has sent a power saving triggering request. The power saving triggering request may be layer 1 based such as the SR or a layer 3 base such as overheated indicator. For example, if the UE 700 is configured with the periodicity of power saving indicator as "5 slots" and the offset as "0 slot" and UE has sent the overheated indicator on the slot n+1, the UE 700 may start monitoring the power saving indicator on the slot n+5.

In some of the present implementations, the power saving indicator may be a CSI-RS which may be configured in the power saving parameter configuration The RS configuration for power saving indicator may be associated with the CSI report configuration, which may include at least the reportQuantity parameter to indicate the CSI contained in the report, such as channel quality information (CQI), precoding matrix indicator (PMI) or rank indicator (RI). There may be the CSI report timing configured in the CSI report configuration, which may indicate the time offset between the power saving indicator and the corresponding CSI report.

The PUCCH resource information may be configured in the CSI report configuration, which may indicate the PUCCH resource for transmitting the CSI report corresponding to the power saving indicator. For example, the UE 700 may be configured to monitor power saving indicator on the symbol which is based on "4 symbols" offset before the PDCCH monitoring occasion.

The UE 700 may be configured to monitor the PDCCH every 5 slots with "0 slot" offset. The UE may, therefore, monitor the PDCCH starting from the slot n, followed by the slot n+5, etc. The power saving parameter configuration may contain the CSI report associated with the power saving indicator and the UE 700 may be required to transmit the CQI and the PMI obtained based on the power saving indicator on the PUCCH resource #1 on 3 slots after the UE 700 receives the power saving indicator.

The UE 700 may not receive the power saving indicator on the 10th symbol of slot n−1, but the UE 700 may receive the power saving indicator on the 10th symbol of slot n+4. The UE 700 may, therefore, calculate the CQI and the PMI based on the power saving indicator. The UE 700 may transmit the CSI report on the slot n+7 on the PUCCH resource #1. The BS 600 may consider that the UE 700 has successfully received the power saving indicator if the BS 600 successfully receives the CSI report corresponding to the power saving indicator. The specification impact for this implementation is that there is a CSI report configuration in the power saving parameter configuration, and there is a triggering offset and resource for the CSI report in that CSI report configuration.

Figure 8:
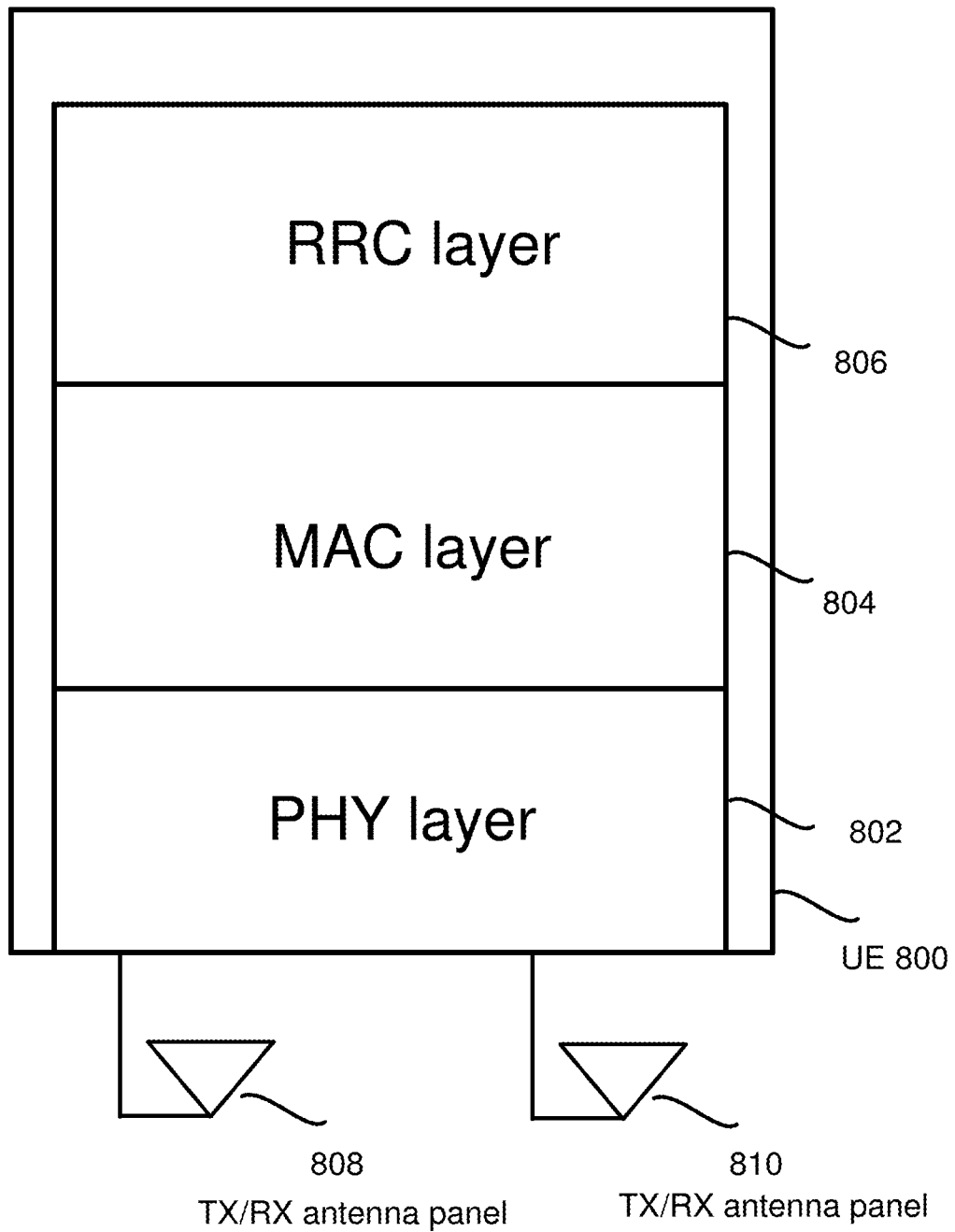
FIG. 8 is a schematic diagram illustrating an example architecture of a UE, in accordance with an example implementation of the present disclosure.

FIG. 8 is a schematic diagram illustrating an example architecture of a UE, in accordance with an example implementation of the present disclosure. As shown in FIG. 8, a UE 800 may include a protocol stack that contains, among other protocol layers, an RRC layer 802, a MAC layer 804, and a PHY layer 806). The PHY layer 806 may be coupled to at least one Transmit (TX)/Receive (RX) antenna component 812 and another TX/RX antenna 814 for transmitting and receiving signals. The UE 800 may further include a controller (not shown), such as a processor or a microcontroller to coordinate the activities of the various layers of the UE 800.

For example, the controller of the UE 800 may set and coordinate the PHY layer 806, the MAC layer 804, and the RRC layer 802 based on the received signals from either or both of the TX/RX antenna components 812 and 814. The controller may also set the parameter of transmission for the TX/RX antenna panels 812 and 814, and the parameter may indicate to the UE 800 to select both or one of the antenna panels for transmission/reception.

In some of the present implementations, the UE 800 may be configured with 4 PUCCH resource in the PUCCH resource configuration. The UE 800 may also be configured with a list of PUCCH-SpatialRelationInfo in the PUCCH resource configuration.

The UE 800 may receive the PUCCH spatial relation Activation/Deactivation MAC-CE from the BS 600 and the MAC-CE may indicate that the PUCCH-SpatialRelationInfoId of the PUCCH resource #1 associates with the SRS #1, the PUCCH-SpatialRelationInfoId of PUCCH resource #2 associates with the SRS #2, the PUCCH-SpatialRelationInfoId of PUCCH resource #3 associates with the SRS #3 and the PUCCH-SpatialRelationInfoId of PUCCH resource #4 associates with the SRS #4.

The UE 800 may have informed the BS 600 that the SRS #1 and SRS #2 are transmitted from one antenna panel (e.g., a TX/RX antenna panel 808) and the SRS #3 and SRS #4 are transmitted from another antenna panel (e.g., a TX/RX antenna panel 810). In these implementations, the BS 600 may configure the SRS #1 and SRS #2 to be in one SRS resource set (e.g., the SRS resource set #1), and the SRS #3 and SRS #4 to be in another SRS resource set (e.g., the SRS resource set #1).

The UE 800 may also have received a power saving parameter configuration in the RRC signaling from the BS 600. The UE 800 may only turn on the antenna panel 810 (or the SRS resource set #2) according to the antenna panel restriction configuration in the power saving parameter. In some of the present implementations, after the UE 800 receives the power saving indicator in the slot n, if the UE 800 receives a DCI format 0_0 which schedules a PUSCH, the UE 800 may select the lowest PUCCH resource ID among the PUCCH resource #3 and the PUCCH resource #4 because the UE 800 only turns on the antenna panel 810 after the slot n. The UE 800 may therefore, transmit the PUSCH based on the spatial domain filter associated with the SRS #3.

In some of the present implementations, the UE 800 may be configured with the PUCCH resource #5 and the PUCCH resource #6 in the power saving parameter configuration. The PUCCH resource #5 may be associated with the SRS resource #3 and the PUCCH resource #6 may be associated with the SRS resource #4. After the UE 800 receives the power saving indicator in the slot n, if the UE 800 receives a DCI format 0_0 which schedules a PUSCH, the UE 800 may select the lowest PUCCH resource ID between the PUCCH resource #5 and PUCCH resource #6. The UE 800 may, therefore, transmit the PUSCH based on the spatial domain filter associated with the SRS #5.

In some of the present implementations, after the UE 800 receives the power saving indicator in the slot n, the UE 800 may be in the power saving state. If the UE 800 receives a DCI format 0_0 in the CORESET #2 which is associated with the TCI-State #6 (e.g., the CRI #2, QCL type-D) based on the MAC-CE and/or the RRC signaling when the UE 800 is in the power saving state, the UE 800 may transmit the PUSCH scheduled by the DCI format 0_0 with the spatial domain filter associated with the CRI #2.

In some of the present implementations, after the UE 800 receives the power saving indicator in the slot n, the UE 800 may be in the power saving state. The UE 800 may expect that there is a SRS resource indicator in DCI format 0_0. If the UE 800 receives a DCI format 0_0 in the slot n+3, the UE 800 may transmit the PUSCH scheduled by the DCI format 0_0 with the spatial domain filter associated with SRS #4 which is indicated by the SRI of the DCI format 0_0 when the UE 800 is in power saving state.

Figure 9:
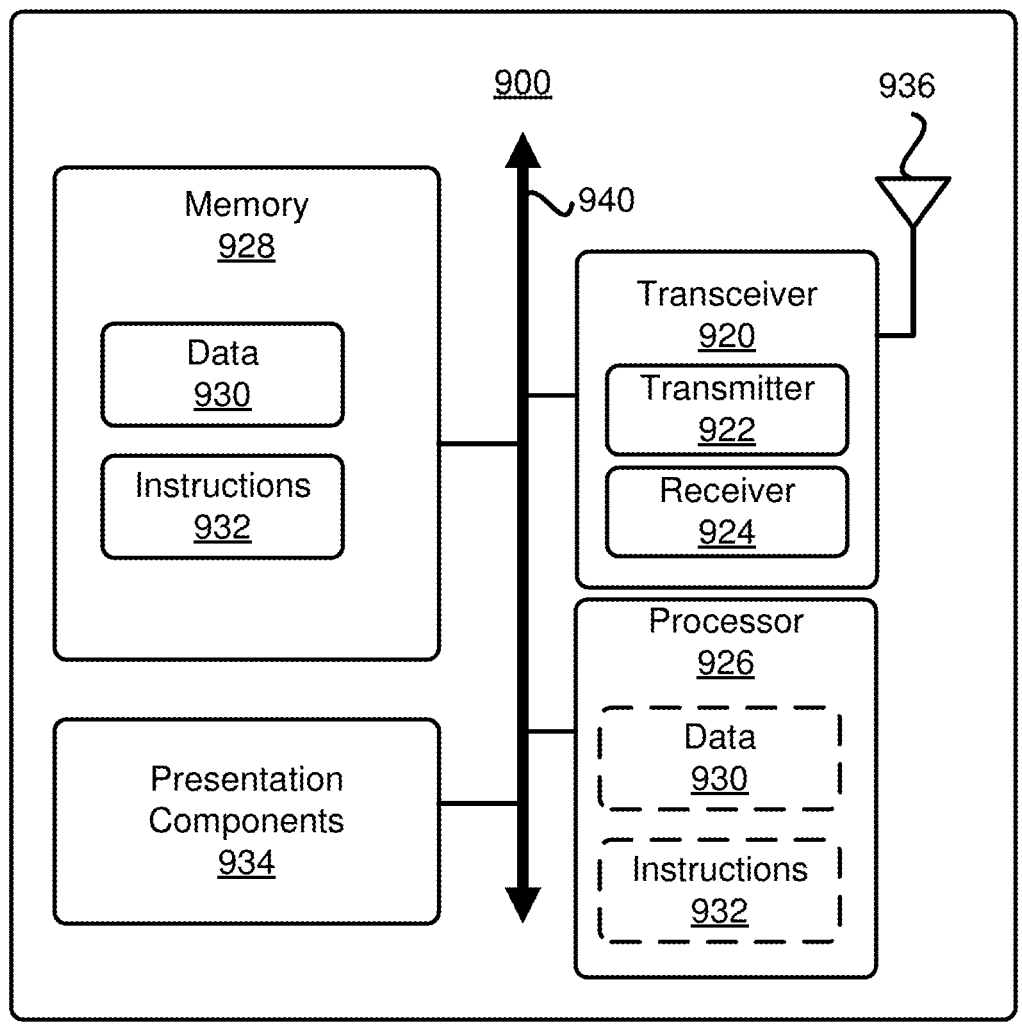
FIG. 9 illustrates a block diagram of a node for wireless communication, according to one example implementation of the present application.

FIG. 9 illustrates a block diagram of a node for wireless communication, according to one example implementation of the present application. As shown in FIG. 9, node 900 may include transceiver 920, processor 926, memory 928, one or more presentation components 934, and at least one antenna 936. Node 900 may also include a Radio Frequency (RF) spectrum band module, a base station communications module, a network communications module, and a system communications management module, input/output (I/O) ports, I/O components, and power supply (not explicitly shown in FIG. 9). Each of these components may be in communication with each other, directly or indirectly, over one or more buses 940.

Transceiver 920 having transmitter 922 and receiver 924 may be configured to transmit and/or receive time and/or frequency resource partitioning information. In some implementations, transceiver 920 may be configured to transmit in different types of subframes and slots including, but not limited to, usable, non-usable and flexibly usable subframes and slot formats. Transceiver 920 may be configured to receive data and control signalings.

Node 900 may include a variety of computer-readable media. Computer-readable media can be any available media that can be accessed by node 900 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 928 may include computer-storage media in the form of volatile and/or non-volatile memory. Memory 928 may be removable, non-removable, or a combination thereof. Exemplary memory includes solid-state memory, hard drives, optical-disc drives, and etc. As illustrated in FIG. 9, memory 928 may store computer-readable, computer-executable instructions 932 (e.g., software codes) that are configured to, when executed, cause processor 926 to perform various functions described herein, for example, with reference to FIGS. 1 through 9. Alternatively, instructions 932 may not be directly executable by processor 926 but be configured to cause node 900 (e.g., when compiled and executed) to perform various functions described herein.

Processor 926 may include an intelligent hardware device, for example, a central processing unit (CPU), a microcontroller, an ASIC, and etc. Processor 926 may include memory. Processor 926 may process data 930 and instructions 932 received from memory 928, and information through transceiver 920, the base band communications module, and/or the network communications module. Processor 926 may also process information to be sent to transceiver 920 for transmission through antenna 936, to the network communications module for transmission to a core network.

One or more presentation components 934 presents data indications to a person or other device. For example, one or more presentation components 934 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for receiving a power saving signal, the method comprising:
receiving, from a base station via radio resource control (RRC) signaling, a minimum scheduling offset restriction ($K_{0min}$) between a physical downlink control channel (PDCCH) and a physical downlink shared channel (PDSCH);
receiving, from a base station, a downlink control information (DCI) comprising a power saving signal for activating the minimum scheduling offset restriction;

transmitting, from a UE, a hybrid automatic repeat request (HARQ) codebook comprising a HARQ feedback bit only when the power saving signal is received, the HARQ feedback bit being a HARQ-acknowledgement-only (HARQ-ACK-only) bit indicating that the UE successfully received the power saving signal;

determining an application delay based on a predefined value; and applying the minimum scheduling offset restriction after the application delay.

2. The method of claim 1 further comprising, during the application delay, applying another minimum scheduling offset restriction between the PDCCH and the PDSCH that is different than the $K_{0min}$.

3. The method of claim 2, wherein the other minimum scheduling offset restriction is configured by radio resource control (RRC) signaling.

4. The method of claim 1, wherein the DCI is first DCI, the method further comprising:
receiving, after the application delay, a second DCI for an applicable new $K_0$ that indicates a new minimum scheduling offset restriction between the PDCCH and the PDSCH;
determining whether the new $K_0$ is bigger than the $K_{0min}$; and
applying the new $K_0$ after determining that the new $K_0$ is bigger than the $K_{0min}$.

5. The method of claim 4 further comprising forgoing applying the $K_{0min}$ after determining that the new $K_0$ is smaller than the $K_{0min}$.

6. The method of claim 1 further comprising, after a time offset from the receiving of the power saving signal, sending a HARQ feedback for the power saving signal from the UE to the base station, wherein the time offset is specified in the power saving signal.

7. The method of claim 1 further comprising, after a time offset from the receiving of the power saving signal, sending a HARQ feedback for the power saving signal from the UE to the base station, wherein the time offset is received via RRC signaling.

8. A user equipment (UE) comprising:
one or more non-transitory computer-readable media having computer-executable instructions for receiving a power saving signal; and
at least one processor coupled to the one or more non-transitory computer-readable media, and configured to execute the computer-executable instructions to:
receive, from the base station via radio resource control (RRC) signaling, a minimum scheduling offset restriction ($K_{0min}$) between a physical downlink control channel (PDCCH) and a physical downlink shared channel (PDSCH);
receive, from a base station, a downlink control information (DCI) comprising a power saving signal for activating the minimum scheduling offset restriction;
transmitting, from a UE, a hybrid automatic repeat request (HARQ) codebook comprising a HARQ feedback bit only when the power saving signal is received, the HARQ feedback bit being a HARQ-acknowledgement-only (HARQ-ACK-only) bit indicating that the UE successfully received the power saving signal;
determine an application delay based on a predefined value; and
apply the minimum scheduling offset restriction after the application delay.

9. The UE of claim 8, wherein the at least one processor is further configured to execute the computer-executable instructions to apply, during the application delay, another minimum scheduling offset restriction between the PDCCH and the PDSCH that is different than the $K_{0min}$.

10. The UE of claim 9, wherein the other minimum scheduling offset restriction is configured by radio resource control (RRC) signaling.

11. The UE of claim 8, wherein the DCI is first DCI, wherein the at least one processor is further configured to execute the computer-executable instructions to:
receive, after the application delay, second DCI comprising an applicable new $K_0$ that indicates a new minimum scheduling offset restriction between the PDCCH and the PDSCH;
determine whether a the new $K_0$ is bigger than the $K_{0min}$; and
apply the new $K_0$ after determining that the new $K_0$ is bigger than the $K_{0min}$.

12. The UE of claim 11, wherein the at least one processor is further configured to execute the computer-executable instructions to forgo applying the minimum scheduling offset restriction indicated by the $K_{0min}$ after determining that the new $K_0$ is smaller than the $K_{0min}$.

13. The UE of claim 8, wherein the at least one processor is further configured to execute the computer-executable instructions to send, after a time offset from the receiving of the power saving signal, a HARQ feedback for the power saving signal from the UE to the base station, wherein the time offset is specified in the power saving signal.

14. The UE of claim 8, wherein the at least one processor is further configured to execute the computer-executable instructions to send, after a time offset from the receiving of the power saving signal, a HARQ feedback for the power saving signal from the UE to the base station, wherein the time offset is received via RRC signaling.

15. The method of claim 1, further comprising determining a location for the HARQ-ACK-only bit in the HARQ codebook.

16. The method of claim 15, wherein the location for the HARQ-ACK-only bit is one of the least significant bit (LSB) in the HARQ codebook and the most significant bit (MSB) in the HARQ codebook.

17. The UE of claim 8, wherein the at least one processor is further configured to execute the computer-executable instructions to determine a location for the HARQ-ACK-only bit in the HARQ codebook.

18. The UE of claim 17, wherein the location for the HARQ-ACK-only bit is one of the least significant bit (LSB) in the HARQ codebook and the most significant bit (MSB) in the HARQ codebook.

* * * * *